Oct. 23, 1923.

W. S. PORTER 1,471,805

INCUBATOR

Filed Feb. 4, 1920     2 Sheets-Sheet 1

Inventor
W. S. Porter;
By
Attorney

Oct. 23, 1923.
W. S. PORTER
1,471,805
INCUBATOR
Filed Feb. 4, 1920
2 Sheets-Sheet 2
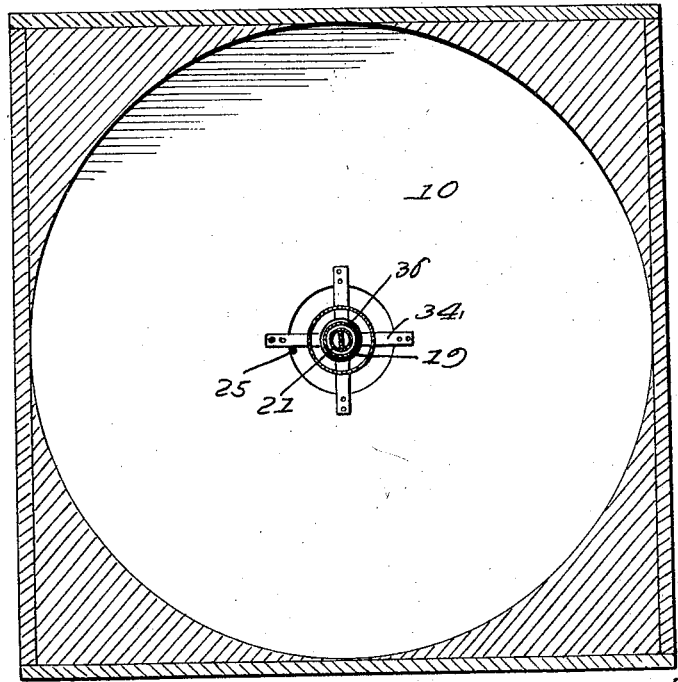
Fig.3.
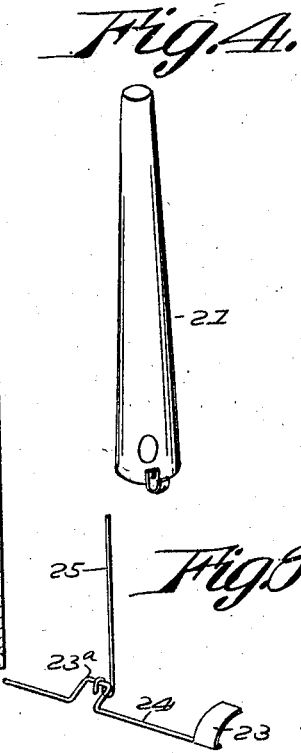
Fig.4.
Fig.8.
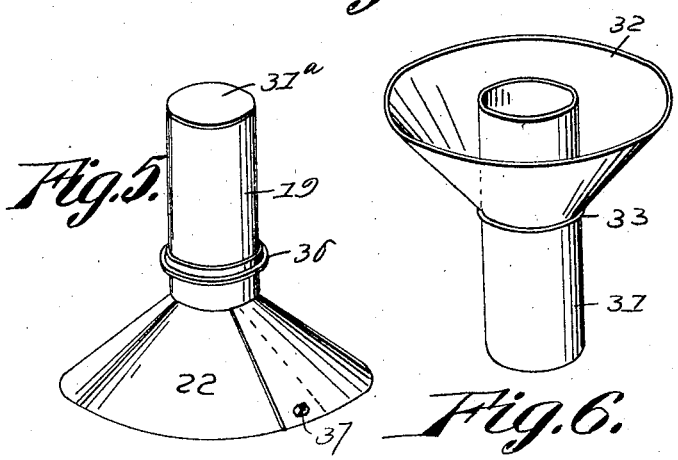
Fig.5.   Fig.6.
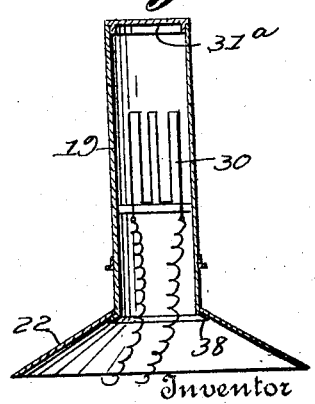
Fig.9.
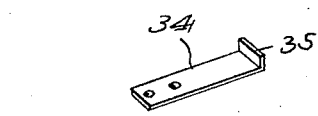
Fig.7.
Inventor
W. S. Porter,
By
Attorney Patented Oct. 23, 1923.

1,471,805

UNITED STATES PATENT OFFICE.

WINFRED S. PORTER, OF BLAIR, NEBRASKA, ASSIGNOR OF ONE-HALF TO LOUIS N. PORTER, OF BLAIR, NEBRASKA.

INCUBATOR.

Application filed February 4, 1920. Serial No. 356,201.

*To all whom it may concern:*

Be it known that I, WINFRED S. PORTER, a citizen of the United States, residing at Blair, in the county of Washington and State of Nebraska, have invented a new and useful Improvement in Incubators, of which the following is a specification.

The object of this invention is to provide an incubator and more particularly a heating system applicable to incubators, whereby a more uniform distribution of heat with the necessary percentage of moisture may be secured under conditions insuring a constant supply of fresh air, properly tempered to produce a gradual softening of the egg shells without abstracting moisture from the contents thereof and while maintaining a perfectly sanitary and sterile condition in the chamber.

A further object is to provide a construction of heating apparatus suitable for use with either an oil lamp, electric coil or equivalent heating unit whereby application to an incubator may readily be effected, and which when required may be removed with facility to leave the interior of the egg chamber unobstructed for cleaning purposes.

Further objects and advantages of the invention will appear in the course of the following disclosure of a preferred embodiment thereof, it being understood that changes in form, proportions and details of arrangement may be resorted to within the scope of the appended claims, without departing from the principles involved.

In the drawings:

Fig. 3 is a similar section on the line 3—3 of Fig. 1.

Figs. 4, 5 and 6 are detail views, respectively, of the chimney, heating drum and heat flue.

Fig. 7 is a similar view of one of the supporting lugs.

Fig. 8 is a detail view of the controller for the heating unit.

Fig. 9 is a sectional view of the heating drum showing an alternative form of heating unit.

Figure 1:
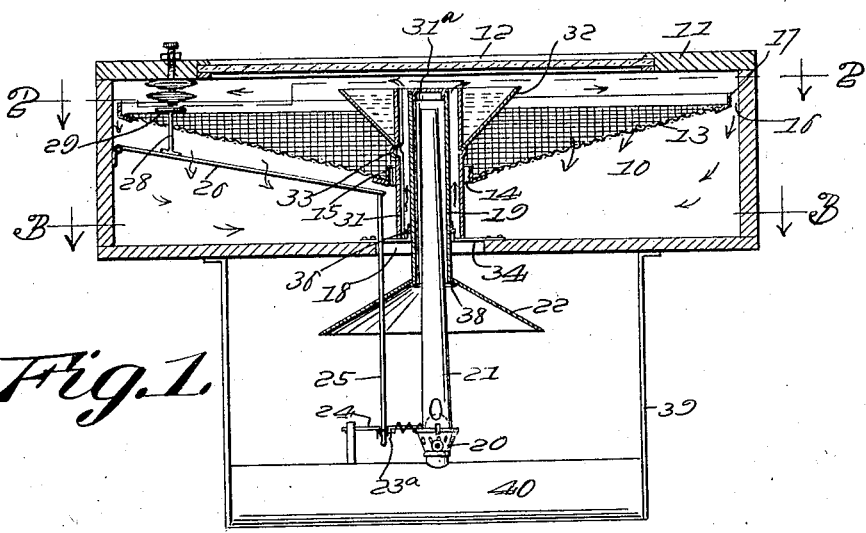
Figure 1 is a vertical sectional view of the incubator.
Figure 2:
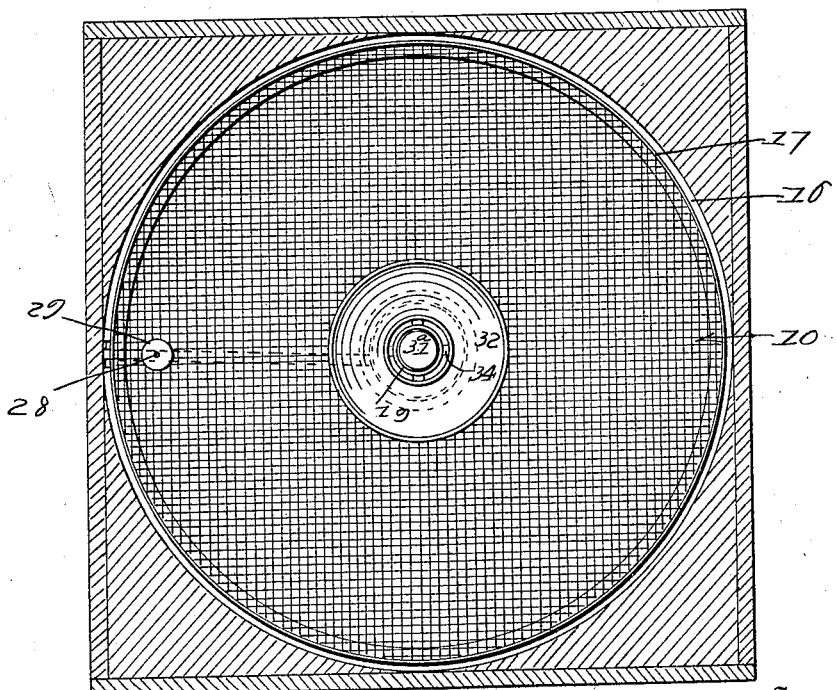
Fig. 2 is a horizontal section on the plane indicated by the line 2—2 of Fig. 1.

The body of the incubator may be exteriorly rectangular, as shown, but it is preferably provided with a circular egg chamber 10 fitted with a top lid or closure 11 coextensive with the chamber and having a transparent panel 12.

The egg-chamber is by preference made comparatively shallow with the egg-tray 13 located near the top and dished in form with a central opening or up-draft passage 14 bounded by an annular guard flange 15 and peripherally spaced from the lateral wall of the chamber to provide a down-draft passage 16. The tray also may as shown consist of a perforated, reticulated or open-work material, such as wire screen or gauze to afford ventilation and a free circulation of air throughout the layer of eggs supported thereby. The outer edge of the tray is flanged as at 17.

An air inlet opening is provided at 18 in the bottom of the egg chamber, preferably at the center or axis of the bounding side wall and in vertical alignment with the opening 14 of the tray, and located in this air inlet opening and occupying a portion only thereof is a heat-drum 19 which may extend upward through and occupy a portion of the central draft passage 14 of the tray, to the end that heat radiated from the wall of the drum throughout the length, extending from a point below the plane of the bottom of the egg-chamber to a point above the plane of the center of the egg-tray will induce an influx of air from the outside of the incubator and cause an ascending column of warm air, which, impinging against the top of the egg-chamber, will spread in all directions equally and will be distributed evenly throughout the horizontal area of the egg-tray. The depression of the tray at its center further serves to equalize the temperature applied to the eggs in that the approach to the center or source of heat is compensated for by receding from the top or zone of higher temperature and approaching the bottom or zone of lower temperature. Thus, taking into consideration the gradually increasing specific gravity of the circulating medium, and the fact that the source of heat is equidistant radially in all directions from the bounding wall of the chamber, and that the rising column of heated air and the outlet for the cooler, less pure and heavier air are both at the center of the chamber, the tray has been constructed and positioned to locate the eggs supported thereby in a zone in which, throughout its area, uniformity of temperature is maintained.

When a lamp is employed as the heating unit, as shown at 20, the chimney 21 thereof is extended axially into and through the heat drum to a point near its upper closed end and the annular space between the chimney and the wall of the drum constitutes a down-draft flue for products of combustion, and the outlet of this flue is positioned so that the discharge therefrom may not pollute the air inducted into the egg-chamber through the inlet opening in the floor of the incubator, or beyond the zone of the air influx due to the heating influence of the drum, and to this end the drum is extended considerably below the inlet 18 and is provided with a conical or flared distributing nozzle 22 having an area greater than, and removed from, said opening to accomplish the desired object.

Incidentally it is desirable to employ thermostatic means for regulating the heat unit and when a lamp is serving this purpose a blade or flame trip 23 may be used to increase or reduce the flame,—a crank 23ᵃ on the spindle 24 of the same being connected by a rod 25 with a lever or bracket arm 26 movably mounted in the egg chamber and actuable by a thermostat 27 of the double-disc type carried by an adjusting bolt 28 engaged with the lid and adjustable from the outside,—said thermostat being positioned relative to the bracket arm by the closing of the lid which disposes the extremity of said bolt on the bearing disc 29.

It is obvious that other heating units may be employed, as for example an electric coil 30, Fig. 9, or its equivalent a globe, in which case the top of the drum 19 may be open,—for which purpose the upper end thereof is fitted with a removable cap 31 which must be used in connection with the apparatus when a lamp serves as the heating unit to avoid the access of the products of combustion to the interior of the egg chamber.

In order that a proper and efficient circulation of air and distribution of heat may be secured with regularity and certainty under all conditions of use to the end that fresh warm air at the proper temperature may reach the eggs and cause or facilitate the discharge of impure air of a reduced temperature, it is desirable to employ means for separating the inflow and outflow at the opening 18 and provide for conducting the column of heated incoming air to the center of the top of the egg chamber free from any diverting or counter influence tending to act as an interfering agency, and therefore there is disposed to surround and in concentric relation to the heat drum a heat flue 31 which also occupies a portion of the area of the opening 18 in the floor of the egg-chamber and of the air passage 14 in the tray and is open at both upper and lower ends with the lower end about in the plane of the floor of the chamber and its upper end above the tray where it supports a water vessel or moisture distributing element 32 consisting, for example of a funnel seated upon a bead 33 on the tube forming the flue. The column of air in the flue heated by radiation from the wall of the drum rises and as it is discharged it passes over the surface of the liquid contents of the vessel 32 and takes up a quantity of moisture sufficient to properly effect the gradual softening of the egg shells while preventing the undue abstraction of moisture from the contents thereof.

In practice the funnel 32 may be permanently attached to the flue 31, and lugs or ears 34 projecting inwardly over the opening 18 will serve to support the flue, while the upturned terminals 35 thereof will constitute a seat for an exterior bead 36 on the drum.

The distributing nozzle may be constructed separate from the drum, to be applied after the latter is seated, and consist of a split conical band having its edges secured in overlapping relation by a removable fastening such as a bolt 37 to maintain the central opening of the band in embracing relation with the drum above the lower flared lip or flange 38 thereof.

The hangers or brackets 39 serve to support the oil fount 40 and the lamp when the latter is used as the heating unit.

I claim:

1. An incubator having a central bottom air inlet opening, an egg tray having a central opening and distributed down draft passages, and a heating apparatus having a heat flue extending through said opening and partly occupying the air inlet opening, and a return draft heating drum housed within the heat flue and provided below the plane of the inlet end thereof with a peripheral flange constituting a distributing plate for the products of combustion and being of greater diameter than the air inlet opening.

2. An incubator having a central bottom air-inlet opening, an egg-tray having a central opening and distributed down-draft passages, and a heating apparatus having a heat flue extending through said opening and partly occupying the air inlet opening, and a return draft heating drum housed within the heat flue and provided below the plane of the inlet end thereof with a conical distributing nozzle of a peripheral diameter greater than that of said air inlet opening.

3. An incubator having a bottom air-inlet opening intersected by radial inwardly extending lugs, and a heating apparatus having a heating unit provided with a chimney extending vertically through said opening, a drum closed at its upper end and enclosing the said chimney, said drum having a rib resting upon the inner ends of said lugs and extending below the plane of said inlet opening, a conical deflector plate detachably engaged with the lower end of the drum, and a heat flue, open at both ends, enclosing said drum and resting upon said lugs, the heat flue being of smaller diameter than the inlet opening and of larger diameter than said drum.

4. An incubator having a bottom air inlet opening and a heating apparatus having a heat drum extending centrally through and occupying a portion of said opening to heat the surrounding air by radiation and induce an influx thereof through the unoccupied portion of the opening, said drum having a return flue for products of combustion provided below the plane of the bottom of the incubator with a flared outlet for distributing the products of combustion outside the zone of the air influx through said opening.

WINFRED S. PORTER.